(12) United States Patent
Iijima

(10) Patent No.: US 6,798,468 B1
(45) Date of Patent: Sep. 28, 2004

(54) DISPLAY DEVICE WITH A LIGHT-REFLECTIVE POLARIZER AND ELECTRONIC APPARATUS EMPLOYING THE SAME

(75) Inventor: Chiyoaki Iijima, Ina (JP)

(73) Assignee: Seiko Epson Corporation (JP)

( * ) Notice: Subject to any disclaimer, the term of this patent is extended or adjusted under 35 U.S.C. 154(b) by 176 days.

(21) Appl. No.: 09/607,017

(22) Filed: Jun. 29, 2000

Related U.S. Application Data

(63) Continuation of application No. 09/157,255, filed on Sep. 18, 1998, now Pat. No. 6,124,905.

(30) Foreign Application Priority Data

| Sep. 18, 1997 | (JP) | 9-253972 |
| Jan. 28, 1998 | (JP) | 10-16242 |
| Jul. 22, 1998 | (JP) | 10-206784 |

(51) Int. Cl.[7] ............................................ G02F 1/1335
(52) U.S. Cl. ....................................................... 349/61
(58) Field of Search ................................... 349/61, 62

(56) References Cited

U.S. PATENT DOCUMENTS

| 4,678,285 A | * | 7/1987 | Ohta et al. ................. 349/71 |
| RE33,987 E | * | 7/1992 | Suzawa ...................... 349/64 |
| 5,339,179 A | * | 8/1994 | Rudisill et al. ............. 349/65 |
| 5,479,279 A | * | 12/1995 | Barbier et al. .............. 349/74 |
| 5,506,701 A | * | 4/1996 | Ichikawa .................... 349/74 |
| 5,528,720 A | * | 6/1996 | Winston et al. ............ 385/146 |
| 5,686,979 A | * | 11/1997 | Weber et al. ................ 349/96 |
| 5,828,488 A | * | 10/1998 | Ouderkirk et al. |
| 6,025,897 A | * | 2/2000 | Weber et al. ................ 349/96 |
| 6,044,196 A | * | 3/2000 | Winston et al. ............ 385/146 |
| 6,099,134 A | * | 8/2000 | Taniguchi et al. .......... 362/31 |
| RE37,377 E | * | 9/2001 | Gunjima et al. |
| 6,359,668 B1 | * | 3/2002 | Iijima et al. ................ 349/61 |
| 6,359,670 B1 | * | 3/2002 | Broer et al. ............... 349/115 |

FOREIGN PATENT DOCUMENTS

| WO | WO95/17303 | 6/1995 |
| WO | WO95/17691 | 6/1995 |
| WO | WO95/17692 | 6/1995 |
| WO | WO95/17699 | 6/1995 |
| WO | WO95/27919 | 10/1995 |
| WO | WO96/19347 | 6/1996 |
| WO | WO97/01439 | 1/1997 |
| WO | WO97/01440 | 1/1997 |
| WO | WO97/01610 | 1/1997 |
| WO | WO97/01726 | 1/1997 |
| WO | WO97/01774 | 1/1997 |
| WO | WO97/01778 | 1/1997 |
| WO | WO97/01780 | 1/1997 |
| WO | WO97/01781 | 1/1997 |
| WO | WO97/01788 | 1/1997 |
| WO | WO97/01789 | 1/1997 |
| WO | WO97/07653 | 2/1997 |

* cited by examiner

*Primary Examiner*—Robert H. Kim
*Assistant Examiner*—P. R. Akkapeddi
(74) *Attorney, Agent, or Firm*—Harness, Dickey & Pierce, P.L.C.

(57) ABSTRACT

A display device includes a reflective polarizer beneath a liquid-crystal display panel, and a light diffusing plate and a lighting apparatus disposed beneath the reflective polarizer. In a reflective display mode, the display device presents a specular display resulting from a light ray reflected by the reflective polarizer and a diffusion display resulting from a diffused light. In a transmissive display mode, the display device presents a dark display and a diffusion display caused by the light diffusing plate.

12 Claims, 13 Drawing Sheets

*Fig. 13a*
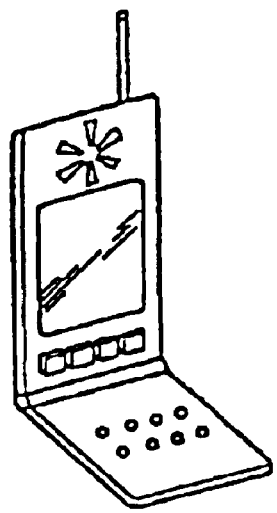
*Fig. 13b*
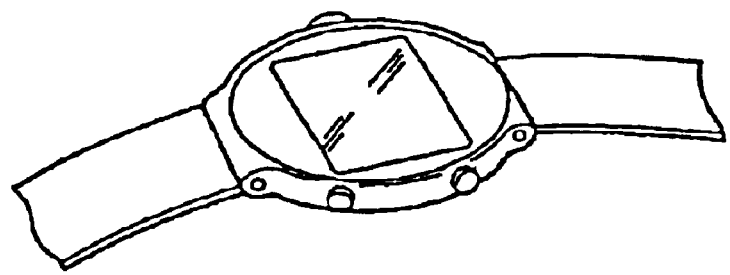
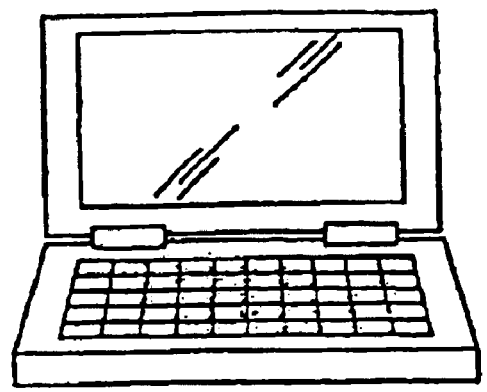
*Fig. 13c*

DISPLAY DEVICE WITH A LIGHT-REFLECTIVE POLARIZER AND ELECTRONIC APPARATUS EMPLOYING THE SAME

This application is a continuation of Ser. No. 09/157,255 filed Sep. 18, 1998 now U.S. Pat. No. 6,124,905.

TECHNICAL FIELD

The present invention relates to a display device and an electronic apparatus. More particularly, the present invention relates to a transflective display device having two modes of display.

DISCUSSION

Since a conventional display device employing TN (Twisted Nematic) liquid crystal or STN (Super-Twisted Nematic) liquid crystal adopts the structure of a liquid-crystal display panel sandwiched between two polarizers, the utilization of light is poor. A transflective display device in particular suffers dark display during a reflective display mode.

Referring to FIG. 14, a conventional transflective liquid-crystal display device using a TN liquid-crystal display panel is now discussed. Referring to FIG. 14, there are shown an upper polarizer 130, a TN liquid-crystal display panel 140, a lower polarizer 170, a transflective plate 180, and a light source 210. Although FIG. 14 shows the components spaced apart from each other, they actually closely adhere to one another.

Discussed now is how white color is presented during a reflective display mode. A light ray 111 is linearly polarized in a direction parallel with the page bearing FIG. 14 by the upper polarizer 130, is twisted in a polarization direction 90° by the TN liquid-crystal display panel 140, becoming a light ray linearly polarized in a direction perpendicular to the page, and is then transmitted through the lower polarizer 170. Part of the light ray transmitted through the lower polarizer 170 is reflected by the transflective plate 180, and is again transmitted through the lower polarizer 170. The light ray is then twisted in a polarization direction 90° by the TN liquid-crystal display panel 140 and is thus linearly polarized in a direction parallel with the page, and is then transmitted through the upper polarizer 130.

Because of its light absorbing feature, the lower polarizer 170 partly absorbs the light ray. This lowers the utilization of light, presenting a dark display during the reflective display mode.

In an effort to resolve this problem, we have proposed a transflective display device (see Japanese Patent Application No. 8-245346) in which the lower polarizer 170 is replaced with a reflective polarizer that reflects a light ray component linearly polarized in a predetermined direction while transmitting a light ray component linearly polarized in a direction perpendicular to the predetermined direction. Referring to FIG. 15, the transflective display device using this reflective polarizer is now discussed.

Referring to FIG. 15, there are shown a non-voltage applied area 605 of the TN liquid-crystal display panel and a voltage applied area 606 of the TN liquid-crystal display panel. There are also shown the upper polarizer 130, an upper glass substrate 302, a lower glass substrate 304, a reflective polarizer 160, a transmissive-absorbent layer 307, and a lighting apparatus 210.

The principle of the reflective display mode is now discussed. A light ray 601, which is linearly polarized in a direction parallel with the page by the upper polarizer 130, is twisted in a polarization direction 900 by the non-voltage applied area 605 of the TN liquid-crystal display panel, thereby becoming a light ray linearly polarized in a direction perpendicular to the page. The light ray is then reflected by the reflective polarizer 160, and is twisted in a polarization direction 90° by the non-voltage applied area 605 of the TN liquid-crystal display panel, thereby becoming a light ray linearly polarized in a direction parallel with the page. The light ray is then transmitted through the upper polarizer 130. When no voltage is applied to the TN liquid-crystal panel, a white display is thus presented.

On the other hand, a light ray 603, which is linearly polarized in a direction parallel with the page by the upper polarizer 130, is transmitted through the voltage applied area 606 of the TN liquid-crystal display panel without any change in a polarization direction, and is transmitted through the reflective polarizer 160. The light ray is then absorbed by the transmissive-absorbent layer 307. A black display is thus presented when a voltage is applied to the TN liquid-crystal display panel.

During the transmissive display mode, a light ray 602 emitted from the lighting apparatus 210 passes through an aperture formed in the transmissive-absorbent layer 307, and is linearly polarized in a direction parallel with the page by the reflective polarizer 160. The light ray is then twisted in a polarization direction 90° by the non-voltage applied area 605 of the TN liquid-crystal display panel, thereby becoming a light ray linearly polarized in a direction perpendicular to the page, and is absorbed by the upper polarizer 130. A black display is thus presented when no voltage is applied to the TN liquid-crystal display panel.

A light ray 604 emitted from the lighting apparatus 210 passes through an aperture formed in the transmissive-absorbent layer 307, and is linearly polarized in a direction parallel with the page by the reflective polarizer 160. The light ray is then transmitted through the voltage applied area 606 of the TN liquid-crystal display panel with no change in a polarization direction, and is transmitted through the upper polarizer 130. A white display is thus presented when a voltage is applied to the TN liquid-crystal display panel.

In the transflective display device using such a reflective polarizer, a positive-negative relationship is reversed between the display in the reflective display mode and the display in the transmissive display mode. For this reason, a user has difficulty watching a display with the lighting apparatus 210 lit under an external light, and the display under such conditions is not adequate depending on the purpose of use.

SUMMARY OF THE INVENTION

It is therefore an object of the present invention to provide a display device that is free from a positive-negative reversal between the reflective display mode and the transmissive display mode. It is another object of the present invention to provide an electronic apparatus employing such a display device.

The above and other objects are provided by a display device includes a reflective polarizer beneath a liquid-crystal display panel, and a light diffusing plate and a lighting apparatus disposed beneath the reflective polarizer. In a reflective display mode, the display device presents a specular display resulting from a light ray reflected by the reflective polarizer and a diffusion display resulting from a diffused light. In a transmissive display mode, the display device presents a dark display and a diffusion display caused by the light diffusing plate.

The present invention works on the above principle, and comprises polarization axis varying means, first polarizing splitter means disposed on one side of the polarization axis varying means which transmits a light ray component linearly polarized in a first direction while reflecting or absorbing a light ray component linearly polarized in a predetermined direction different from the first direction, second polarizing splitter means disposed on the other side of the polarization axis varying means which reflects a light ray component linearly polarized in a second direction while transmitting a light ray component linearly polarized in a predetermined direction different from the second direction, lighting means disposed on the side of the second polarizing splitter means opposite to the polarization axis varying means, and light diffusing means disposed between the second polarizing splitter means and the lighting means which diffuses and reflects a light ray coming in from the second polarizing splitter means, while transmitting a light ray coming from the lighting means toward the second polarizing splitter means.

BRIEF DESCRIPTION OF THE DRAWINGS

FIG. 13 is a perspective view showing an electronic apparatus of the present invention.

DETAILED DESCRIPTION OF THE DRAWINGS

Figure 1:
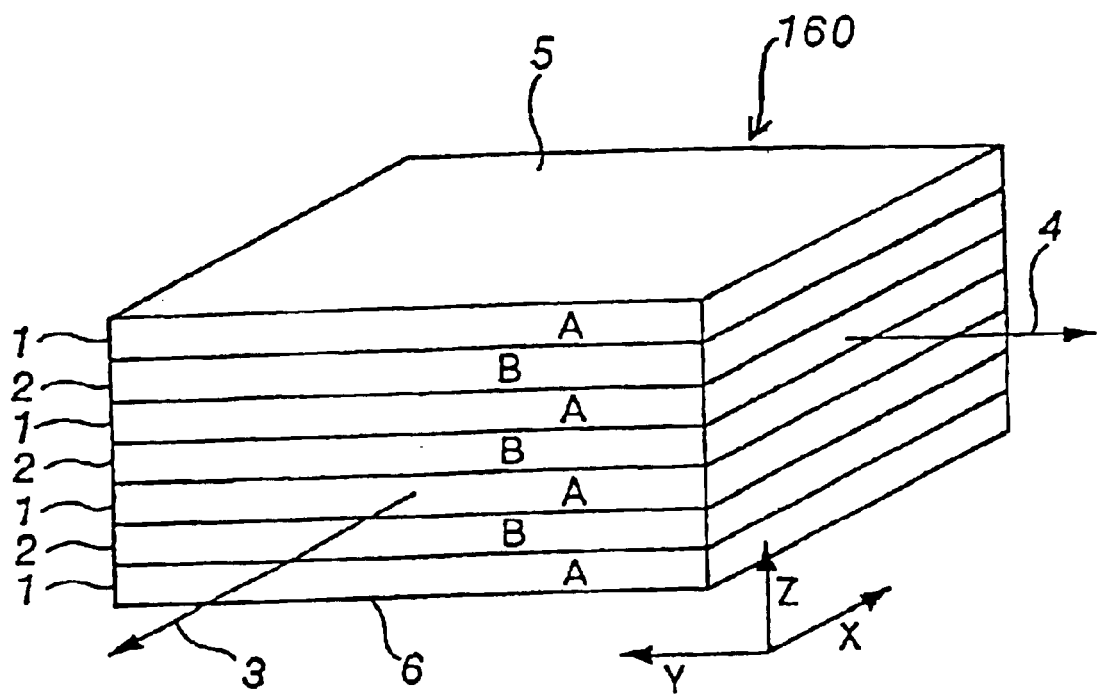
FIG. 1 is a perspective view of a reflective polarizer.
Figure 2:
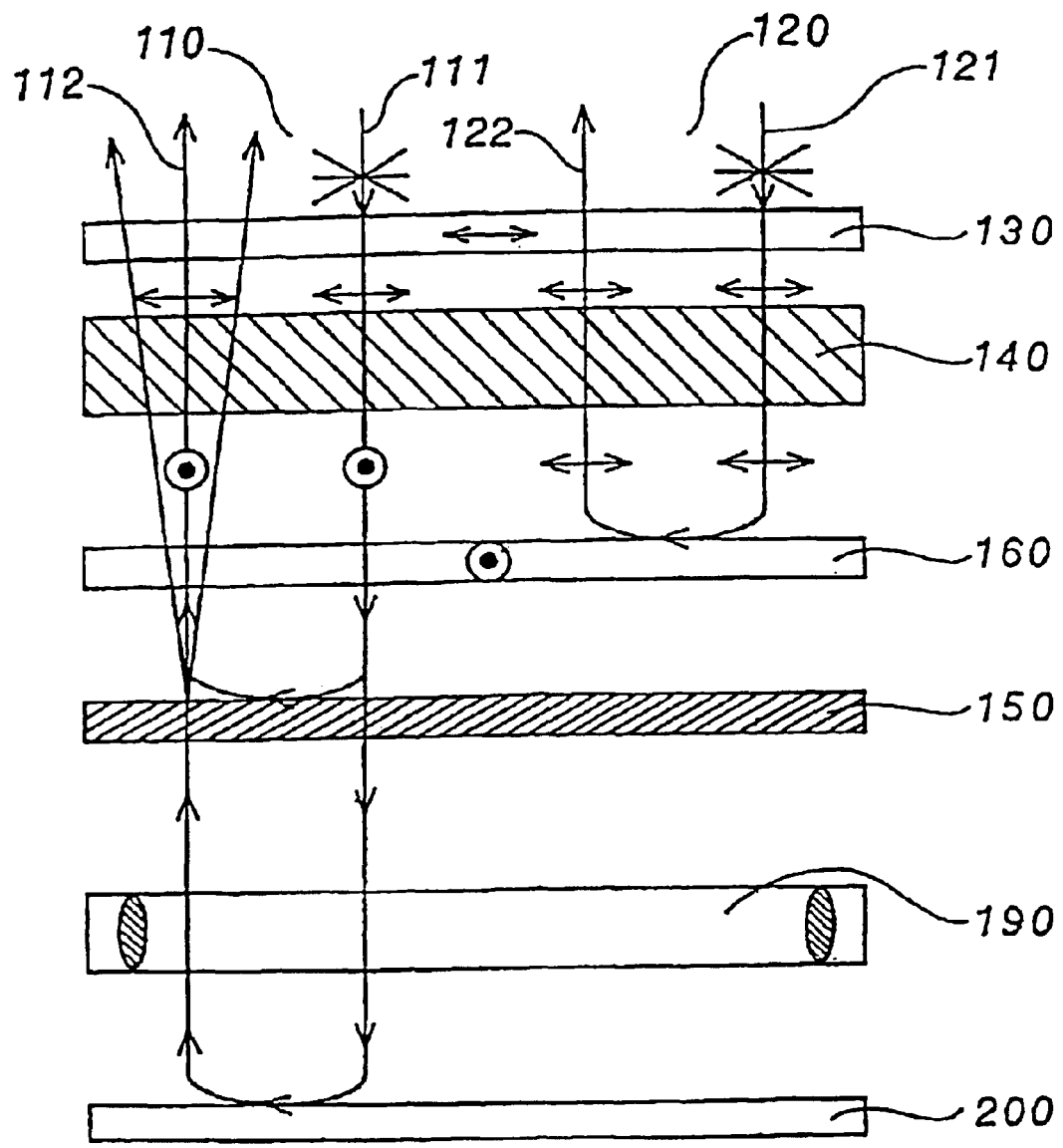
FIG. 2 illustrates the principle of a reflective display mode of the display device of the present invention.
Figure 3:
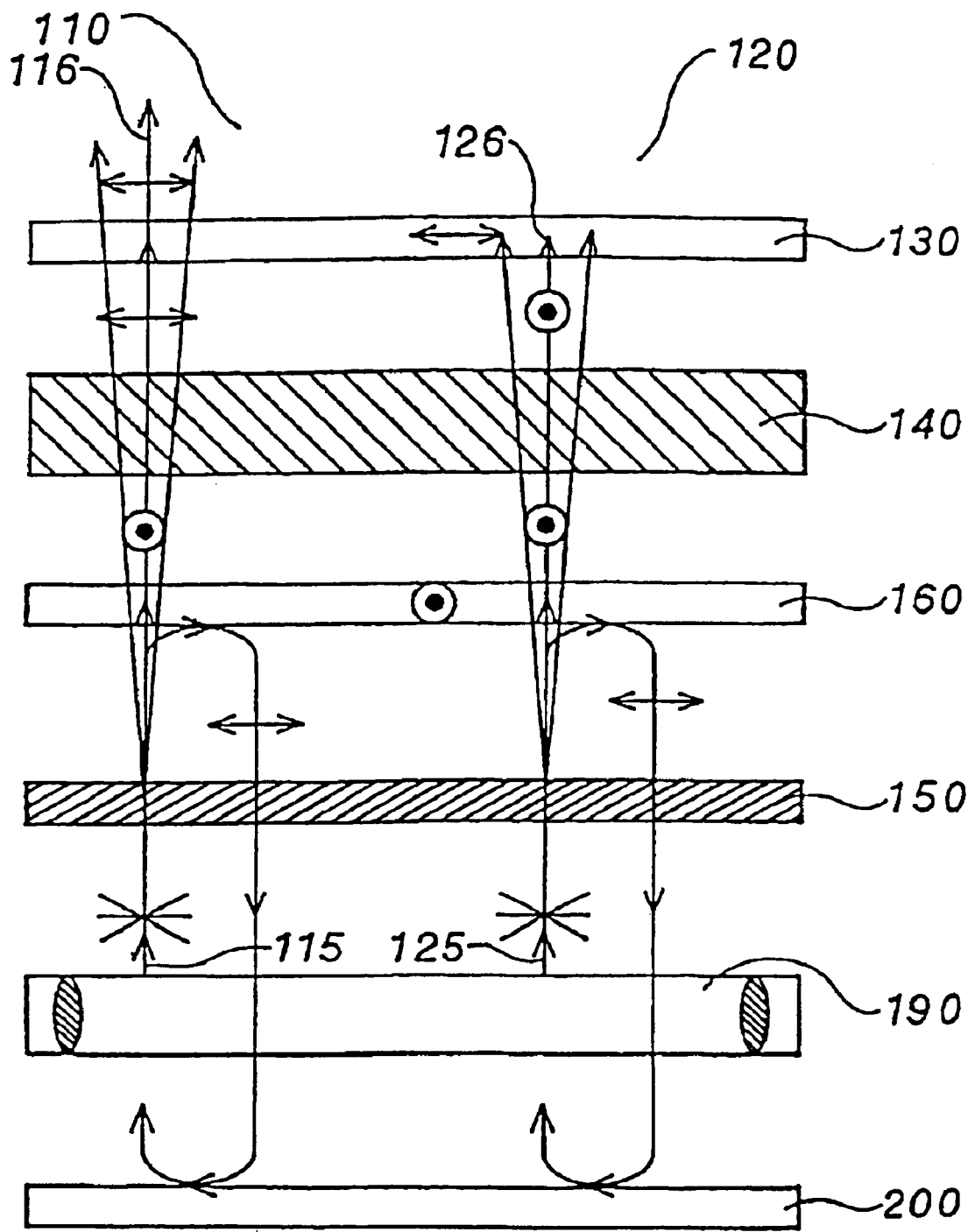
FIG. 3 illustrates the principle of a transmissive display mode of the display device of the present invention.
Figure 4:
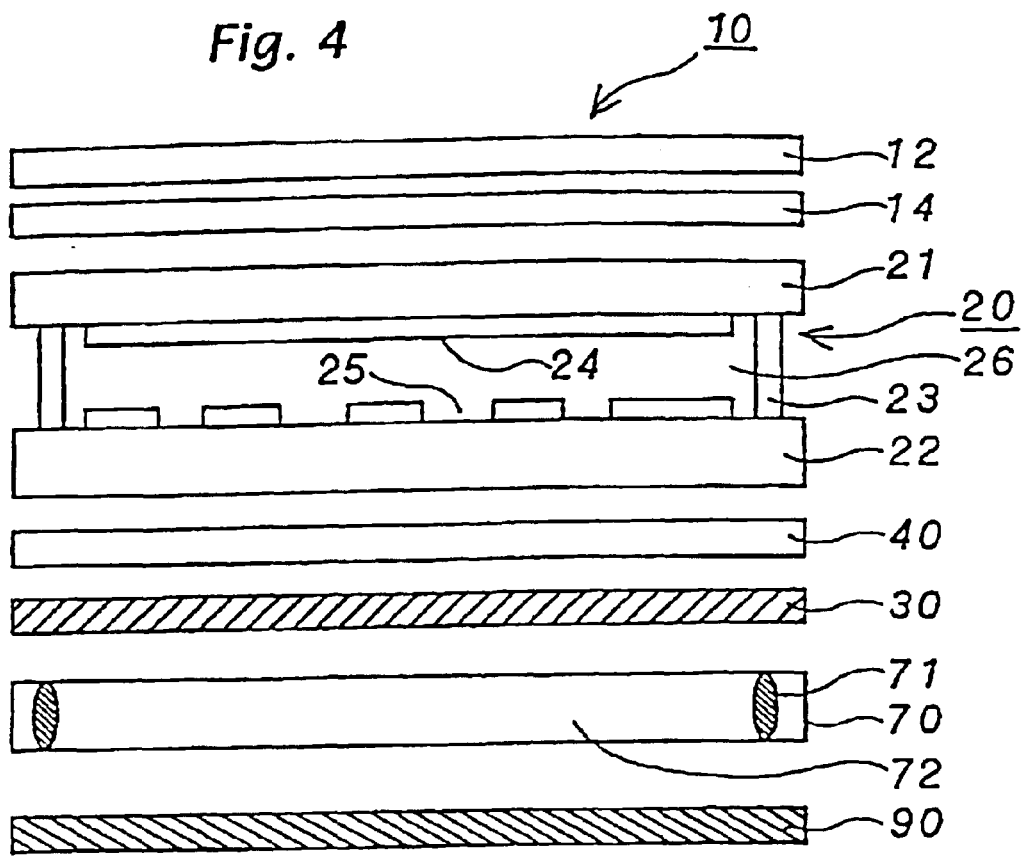
FIG. 4 is an exploded, cross-sectional view showing a transflective display device of a first embodiment of the present invention.
Figure 5:
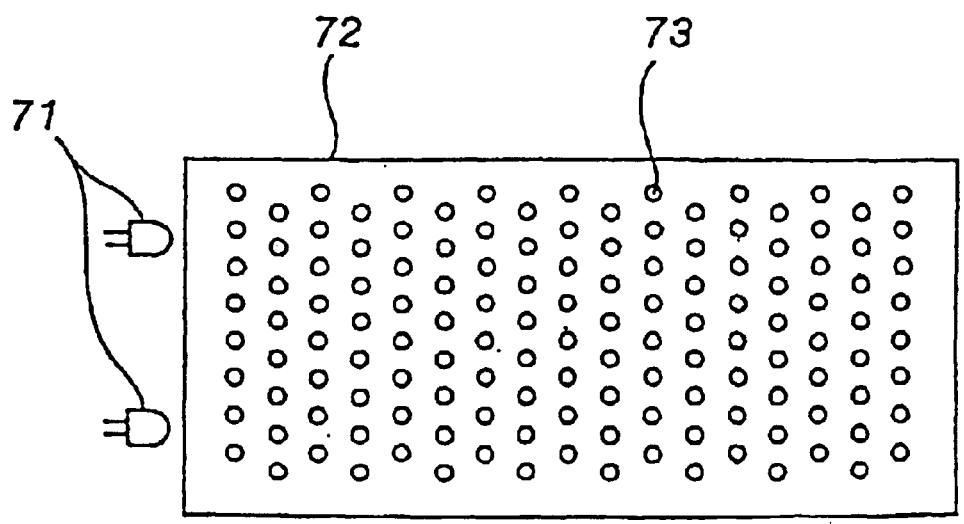
FIG. 5 is an explanatory view showing a lighting apparatus used in the display device of the first embodiment of the present invention.

The principle of the present invention is now discussed referring to FIG. 1, FIG. 2 and FIG. 3. FIG. 1 is a perspective view of a reflective polarizer which is used as polarizing splitter means. FIG. 4 illustrates the principle of display when an external light enters the display device of the present invention, and FIG. 5 is an explanatory view illustrating the principle of display when a light source lights.

Referring to FIG. 1, the reflective polarizer 160 has a structure in which two different types of layers, layer 1 (A layer) and layer 2 (B layer), are alternately laminated. A refractive index ($n_{AX}$) of the A layer 1 in the X direction is different from a refractive index ($n_{AY}$) in the Y direction. The refractive index ($n_{AY}$) of the A layer 1 in the Y direction is approximately equal to a refractive index ($n_{BY}$) of the B layer 2 in the Y direction.

The light ray component linearly polarized in the Y direction, out of the light ray incident at a right angle on a top surface 5 of the reflective polarizer 160, is transmitted through the reflective polarizer 160, and then exits from a bottom surface 6 as a light ray linearly polarized in the Y direction. Conversely, the light ray component linearly polarized in the Y direction, out of the light ray incident at a right angle on the bottom surface 6 of the reflective polarizer 160, is transmitted through the reflective polarizer 160, and exits from the top surface 5 as a light ray linearly polarized in the Y direction. The Y direction is called a polarization axis.

Let $t_A$ represent the thickness of the A layer 1 in the Z direction, $t_B$ represent the thickness of the B layer 2 in the Z direction, and $\lambda$ represent the wavelength of an incident light.

$$t_A n_{AX} + t_B n_{BX} = \lambda/2 \tag{1}$$

With the above equation established, the light ray component linearly polarized in the X direction, out of the light ray, having a wavelength $\lambda$, incident at a right angle on the top surface 5 of the reflective polarizer 160 is reflected by the reflective polarizer 160 as a light ray linearly polarized in the X direction. The linearly polarized light ray having a wavelength $\lambda$ incident on the bottom surface 6 is reflected by the reflective polarizer 160 as a light ray linearly polarized in the X direction. The X direction is called a reflection axis.

Equation (1) holds on the entire visible-light wave range by varying the thickness $t_A$ of the A layer 1 in the Z direction and the thickness Of $t_B$ of the B layer 2 in the Z direction. This arrangement provides a reflective polarizer which reflects a light ray linearly polarized in the X direction as a light ray linearly polarized in the X direction while transmitting a light ray linearly polarized in the Y direction as a light ray linearly polarized in the Y direction, not only in a single color but also in a white color light.

Stretched polyethylene naphtalate (PEN) is used for the A layer and copolyester of naphtalen dicarboxylic acid and terephthallic or isothalic acid (coPEN) is used for the B layer in the reflective polarizer 160. The materials of the reflective polarizer of the present invention are not limited to these materials, and any appropriate materials may be selected. Such a reflective polarizer is disclosed in detail in Japanese Unexamined Patent Publication No. 9-506985(toku-hyo-hei 9-506985).

FIG. 2 illustrates the display device of the present invention under the presence of an external light. The display device employs the TN liquid-crystal display panel 140 as polarization axis varying means. The upper polarizer 130 is disposed on top of the TN liquid-crystal display panel 140. Arranged beneath the TN liquid-crystal display panel 140 are the reflective polarizer 160, a light diffusing layer 150, a light source 190 and a reflective layer 200 in that order from below. The polarization axis of the polarizer 130 is perpendicular to the polarization axis of the reflective polarizer 160.

In a voltage applied area 120 on the right-hand side, a natural ambient light 121 is linearly polarized in a direction parallel with the page by the polarizer 130, and is then transmitted through the TN liquid-crystal display panel 140 with no change in polarization direction. The light ray is then reflected by the reflective polarizer 160, as a light ray linearly polarized in a direction parallel with the page, is transmitted through the TN liquid-crystal display panel 140 with no change in polarization direction, and then exits from the polarizer 130. Since the reflective polarizer 160 reflects light in a specular reflection fashion, the display device presents a bright display on screen only when the light ray reflected from the reflective polarizer is seen at a right viewing angle to a screen. The display device presents a dark display on screen when the light ray reflected from the reflective polarizer is viewed at viewing angles other than the right angle to the screen.

In a non-voltage applied area 110 on the left-hand side, a natural ambient light 111 is linearly polarized in a direction parallel with the page by the polarizer 130, and is twisted in a polarization direction 90° by the TN liquid-crystal display panel 140, becoming a light ray linearly polarized in a direction perpendicular to the page. The light ray is then transmitted through the reflective polarizer 160, and is partly transmitted through the light diffusing layer 150. The light ray transmitted through the light diffusing layer 150 is reflected by the reflective layer 200, is again transmitted through the light diffusing layer 150, and exits toward the reflective polarizer. Part of the light ray transmitted through the reflective polarizer 160 is diffused through and reflected by the light diffusing layer 150, and then exits toward the reflective polarizer 160. The light ray linearly polarized in a direction perpendicular to the page, exiting to the reflective polarizer and transmitted again through the reflective polarizer 160, is twisted in a polarization direction 90° by the TN liquid-crystal display panel 140, becoming a light ray linearly polarized in a direction parallel with the page, and is then transmitted through the polarizer 130. Since the light ray transmitted through the polarizer 130 is a light ray diffused through the light diffusing layer 150, it is white in all directions.

In the voltage applied area 120, the light reflected by the reflective polarizer 160 is an exiting light ray 122, while in the non-voltage applied area 110, the light transmitted through the reflective polarizer 160 is an exiting light 112, which looks white from all directions, as a result of a diffusion action by the light diffusing layer 150. Under the external light, the display device presents a positive with a dark (black) display with a white background in almost all directions. However, a positive with a specular display with a white background is obtained in the reflection direction of the light ray reflected by the reflective polarizer.

Referring to FIG. 3, the liquid-crystal display device remains unchanged from the one shown in FIG. 2. In the voltage applied area 120 on the right-hand side, a light ray component aligned with the polarization direction of the reflective polarizer 160, out of a light ray 125 from a light source, is transmitted through the reflective polarizer 160 as a light ray linearly polarized in a direction perpendicular to the page. The light ray transmitted through the reflective polarizer 160 is then transmitted through the TN liquid-crystal display panel 140 with no change in polarization direction, and is absorbed by the polarizer 130. The resulting display thus appears black.

In the non-voltage applied area 110 on the left-hand side, a light ray component aligned with the polarization direction of the reflective polarizer 160, out of a light ray 115 from the light source, is transmitted through the reflective polarizer 160 as a light ray linearly polarized in a direction perpendicular to the page. The light ray transmitted through the reflective polarizer 160 is then twisted in a polarization direction 90° by the TN liquid-crystal display panel, becoming a light ray linearly polarized in a direction parallel with the page, and is then transmitted through the polarizer 130.

With the light source lit, the voltage applied area 120 presents a dark display as a result of light absorption through the polarizer 130 while the non-voltage applied area 110 presents a light display as a result of light transmission through the polarizer 130. A black positive with a light source color background is presented when the light source 190 lights. In conclusion, a positive display is presented regardless of whether the display device is under the external light or with the light source lit.

The voltage applied area and the non-voltage applied area may be reversed in presentation by rotating the polarization axis of the polarizer 130 by 90°. In this case, a negative display is presented regardless of whether the display device is under the external light or with the light source lit.

In the above discussion, the TN liquid-crystal display panel 140 is employed. The basic principle of the present invention remains unchanged even if another liquid-crystal display with its polarization axis varied by a voltage or the like, such as an STN liquid-crystal display panel or ECB (Electrically Controlled Birefringence) liquid-crystal display panel, is alternatively employed.

The present invention works on the above principle, and comprises polarization axis varying means, first polarizing splitter means disposed on one side of the polarization axis varying means which transmits a light ray component linearly polarized in a first direction while reflecting or absorbing a light ray component linearly polarized in a predetermined direction different from the first direction, second polarizing splitter means disposed on the other side of the polarization axis varying means which reflects a light ray component linearly polarized in a second direction while transmitting a light ray component linearly polarized in a predetermined direction different from the second direction, lighting means disposed on the side of the second polarizing splitter means opposite to the polarization axis varying means, and light diffusing means disposed between the second polarizing splitter means and the lighting means which diffuses and reflects a light ray coming in from the second polarizing splitter means, while transmitting a light ray coming from the lighting means toward the second polarizing splitter means.

Used for the polarization axis varying means is a liquid-crystal display panel, and preferably, a TN liquid-crystal display panel, an STN liquid-crystal display panel, or an ECB liquid-crystal display panel. The STN liquid-crystal display panels include the type employing an optically anisotropic material for color correction. Preferably, the polarizer is used for the first polarizing splitter means and the reflective polarizer described with reference to FIG. 3 is used for the second polarizing splitter means. The reflective polarizer described with to FIG. 3 may be used for the first polarizing splitter means.

Preferably used for the lighting means is a lighting apparatus including a light source as a light emitting body and a light guide plate for outputting a light from the light source toward the light diffusing means. The light diffusing means needs to transmits the light coming in from the lighting means toward the second polarizing splitter means.

With the lighting means lit, namely, during the transmissive display mode, two display modes of dark and light displays are available depending on the state of the polarization axis of the polarization axis varying means: in the dark display mode (hereinafter simply referred to as dark display), the light ray from the lighting means is not transmitted through the first polarizing splitter means and in the light display mode (hereinafter referred to as diffusion display), the light ray from the light source is diffused through the light diffusing means and is then transmitted through the first polarizing splitter means.

Under the external light, namely, during the reflective display mode, two display modes of specular display and diffusion display are available depending on the state of the polarization axis of the polarization axis varying means: in the specular display mode (hereinafter referred to as specular display), the external light is reflected by the second polarizing and in the diffusion display mode (hereinafter referred to as diffusion display), the external light is diffused and reflected by the light diffusing means. To present the specular display, no diffusion layer is preferred in the optical path of the light reflected by the second polarizing splitter means. In the specular display, a light display is presented only when the light ray reflected by the second polarizing splitter means is viewed from the direction of reflection while a dark display is presented when the light ray reflected by the reflective polarizer is viewed from directions other than the direction of reflection. The specular display generally looks dark. On the other hand, the diffusion display looks light from all directions. For this reason, a resulting contrast is free from any particular problem in presentation, though the two display modes make use of the exiting light from the polarizer.

In the above two display modes, the specular display in the reflective display mode corresponds to the dark display in the transmissive display mode, and the diffusion display in the reflective display mode corresponds to the diffusion display in the transmissive display mode. A transflective display device free from the reversal in the positive-negative relationship is thus provided.

In the above arrangement, the light diffusing means may emit a color light ray. Specifically, a polymeric film containing colored micro-pearl may be used for the light diffusing means.

The light diffusing means may emit a light ray. Specifically, a fluorescent plate may be used for the light diffusing means, and the diffusion display appears in a fluorescence color.

Provided on the side of the lighting means opposite to the light diffusing means is light reflective means for reflecting a light ray coming in from the lighting means. The lighting means transmits a light ray coming in from the light diffusing means toward the light reflective means, while transmitting a light ray coming in from the light reflective means toward the light diffusing means.

In the diffusion display during the reflective display mode, the external light is partly reflected by and partly transmitted through the light diffusing means. The light ray transmitted through the light diffusing means is transmitted through the lighting means, is reflected by the reflective means, and is again transmitted through the light diffusing means. For this reason, the diffusion display in the reflective display mode is even lighter. In the diffusion display during the transmissive display mode, the light ray component linearly polarized in the second predetermined direction, out of the light ray from the lighting apparatus, transmitted through the light diffusing means, is reflected by the second polarizing splitter means, and the reflected light ray is again reflected by the light reflective means. As the light ray is repeatedly reflected and diffused, the light ray is partly varied in a polarization direction, and is then transmitted through the second polarizing splitter means. The light reflective means reflects a light ray that is reflected toward the lighting apparatus by the light diffusing means and a light ray component of the light ray emitted by the light source exiting toward the light reflective means. For this reason, the utilization of light is improved, presenting a lighter diffusion display in the transmissive display mode.

The light reflective means may emit a light ray or a color light ray. To emit a light ray, a fluorescent plate may be employed, and to emit a color light ray, a hologram may be employed. With this arrangement, the diffusion displays in the transmissive display mode and reflective display mode are colored, providing an easy-to-see feature to the display device.

Light exit angle control means for outputting a light ray at an exit angle within a predetermined range may be further arranged between the lighting means and the light diffusing means or between the second polarizing splitter means and the light diffusing means.

A film including a plurality of layers having different refractive indexes may be used for the light exit angle control means. Such a film is, for example, Lumisty Film (trade name) manufactured by SUMITOMO CHEMICAL CO., LTD.

Figure 12:
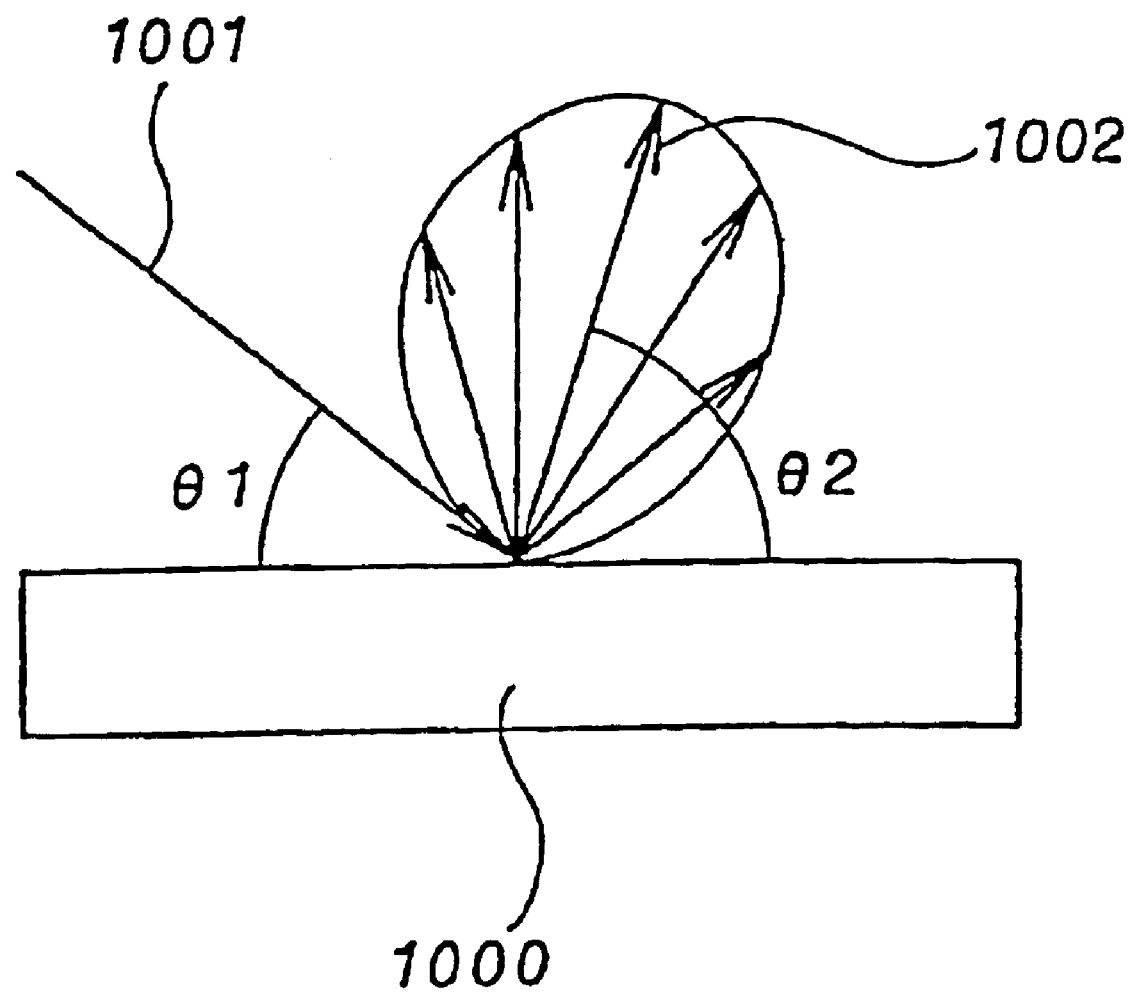
FIG. 12 illustrates the function of exit angle control means used in the third and fourth embodiments of the present invention.
Figure 14:
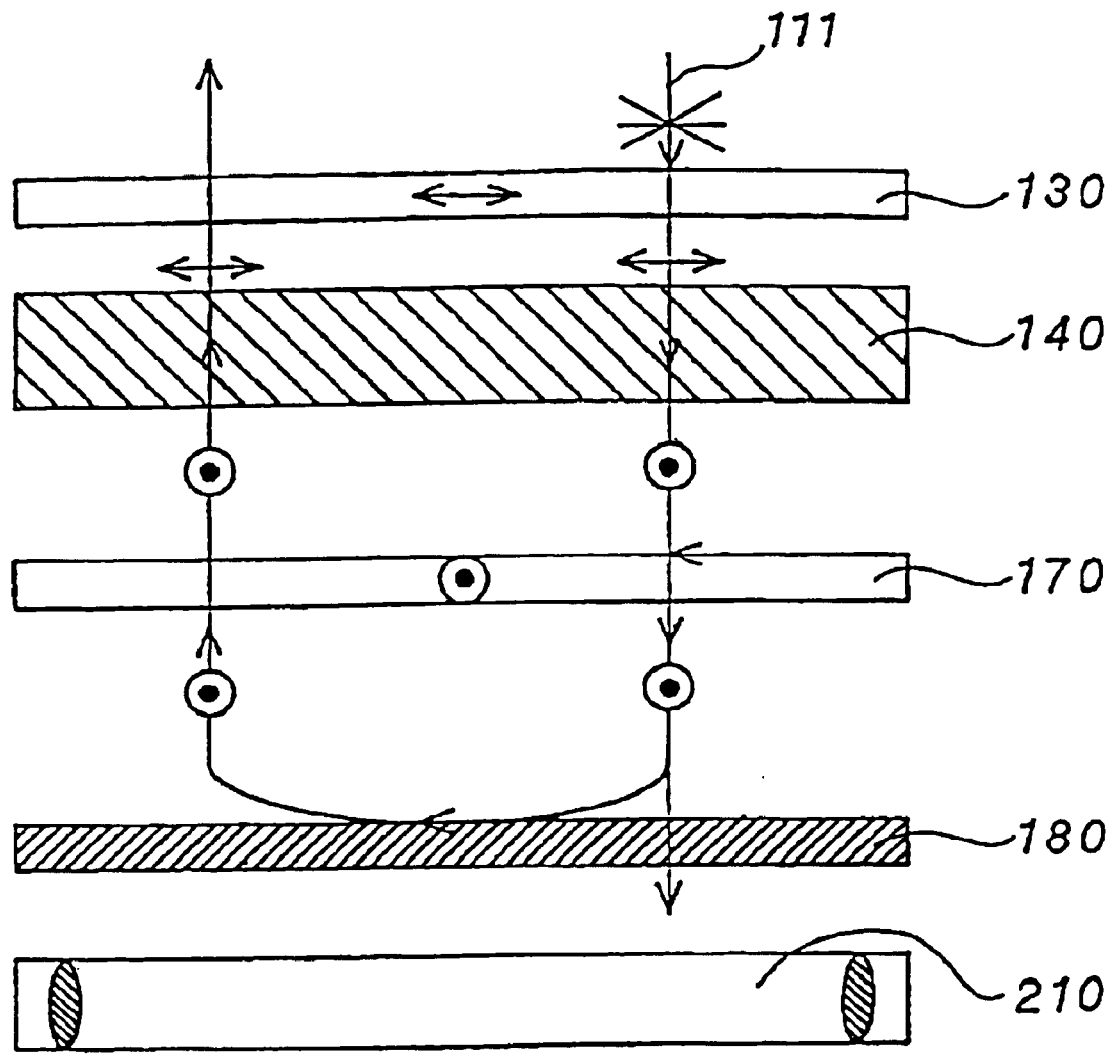
FIG. 14 is a cross-sectional view of a conventional transflective display device employing a structure in which a liquid crystal is sandwiched between a pair of polarizers.
Figure 15:
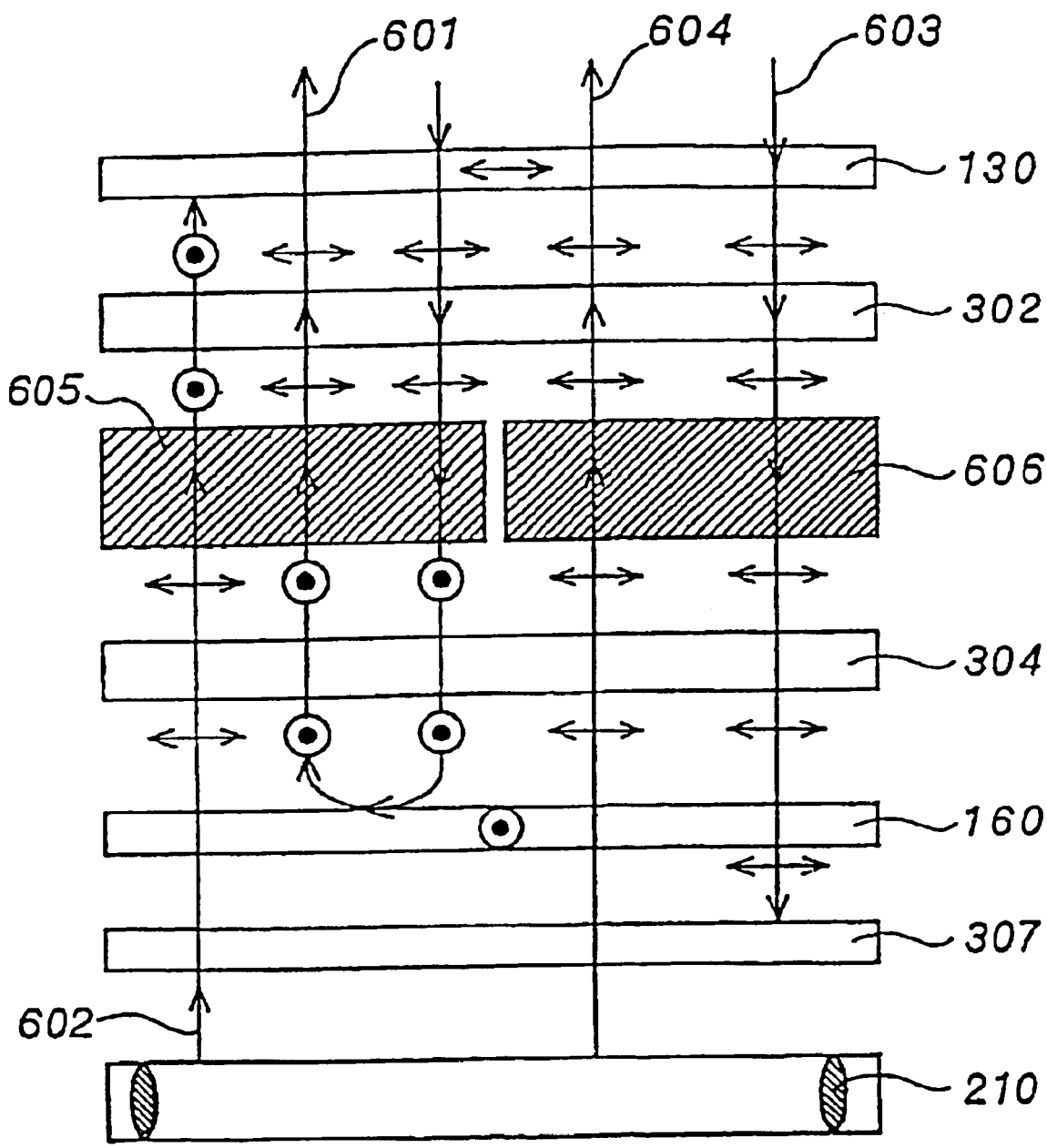
FIG. 15 is a cross-sectional view showing a conventional transflective display device employing a reflective polarizer.

Referring to FIG. 12, the exit angle control means is now discussed. Designated 1000 is a film in which a Lumisty Film is disposed on top of a light diffusing plate or a light reflector. A light ray 1001 is incident on the film 1000, and exits as a diffused light ray. The strongest light ray of the diffused light is now designated 1002. The incident angle $\theta1$ of the incident light ray 1001 is different from the exit angle of the exiting light ray 1002. When a light ray is incident at an angle of $\theta1$, the light ray reflected from the film exits at an exit angle of $\theta2$. However, a light ray reflected by the second polarizing splitter means exits at an exit angle of $\theta1$. With the device viewed at $\theta2$, an increased contrast results.

Arranged between the lighting means and the light diffusing means is third polarizing splitter means which reflects a light ray component linearly polarized in a third direction, while transmitting a light ray component linearly polarized in a predetermined direction different from the third direction. Like the second polarizing splitter means, the third polarizing splitter means may be the reflective polarizer described with reference to FIG. 3. By arranging the second polarizing splitter means and the third polarizing splitter means with their polarization axes out of alignment, the light ray transmitted through the second polarizing splitter means is reflected by the third polarizing splitter means in the diffusion display in the reflective display mode. The diffused light ray transmitted through the first polarizing splitter means is increased, resulting in a lighter diffused display. An excessively large angle set between the polarization axis of the second polarizing splitter means and the polarization axis of the third polarizing splitter means makes it difficult for the light ray from the lighting apparatus to transmit through the second and third polarizing splitter means. The diffusion display in the transmissive display mode is thus darkened. If the angle between the two polarization axes is too small, most of the light ray transmitted through the second polarizing splitter means is also transmitted through the third polarizing splitter means, reducing the effect of lighting the diffusion display in the reflective display mode. The angle between the polarization axis of the second polarizing splitter means and the polarization axis of the third polarizing splitter means is preferably between 45° and 80°, and more preferably between 60° and 75°.

The reflective polarizer as the second polarizing splitter means or the third polarizing splitter means is characterized by its laminate structure in which layers having birefringence and layers having no birefringence are alternately laminated. By adjusting the thickness of each layer in the lamination, a light ray in the visible-light wavelength region having one polarization direction is reflected and a light ray in the visible-light wavelength region having another polarization direction is transmitted therethrough, and the diffusion display appears white.

The electronic apparatus of the present invention comprises a display device with a liquid-crystal display panel as a display unit, wherein the display device comprises a liquid-crystal display panel having a liquid crystal interposed between a pair of substrates, a polarizer disposed on one side of the liquid-crystal display panel, a first reflective polarizer disposed on the other side of the liquid-crystal display panel, a lighting apparatus disposed on the side of the first reflective polarizer opposite to polarization axis varying means, and a light diffusing plate which, arranged between the first reflective polarizer and the lighting means, diffuses and reflects a light ray coming in from the first reflective polarizer while transmitting a light ray coming in from the lighting apparatus toward the first reflective polarizer.

With the above arrangement, the electronic apparatus of the present invention is free from the positive/negative reversal.

The display device of the present invention finds applications in both a passive matrix addressing liquid-crystal display panel and an active matrix addressing liquid-crystal display panel in which the liquid crystal is addressed by thin-film transistors or thin-film diodes formed on a substrate.

Referring again to the drawings, the preferred embodiments of the present invention are now discussed. FIG. 4 is an exploded, cross-sectional view showing the display device of a first embodiment of the present invention. The display device of the first embodiment is a transflective display device having two display modes, a reflective display mode and a transmissive display mode.

A display device 10 of the first embodiment employs an STN liquid-crystal display panel 20 for the polarization axis varying means. A retardation film 14 and a polarizer 12 are laminated on the STN liquid-crystal display panel 20 in that order therefrom. Arranged beneath the STN liquid-crystal display panel 20 are a reflective polarizer 40 as the first polarizing splitter means, a light diffusing plate 30 as the light diffusing means, a lighting apparatus 70 as the lighting means, and a reflector 90 as the light reflective means in that order from below. The reflective polarizer described with reference to FIG. 1 may be used for the reflective polarizer 40. The reflective polarizer 40 has a thickness within a range of 50 to 200 μm, and is glued onto a glass substrate 22 using acrylic adhesive therebetween.

The light diffusing plate 30 preferably has a haze value within a range of 5 to 85. A large haze value lowers the lightness on the screen while resulting in a large viewing angle. The light diffusing plate 30 may be a resin in which micro-particles are dispersed, and the resin is applied onto the surface of the reflective polarizer 40. A plastic film with aluminum or silver deposited thereon, or aluminum foil may be used for the reflector 90. The thickness of the reflector 90 is preferably within a range of 10 μm to 200 μm.

In the STN liquid-crystal display panel 20, an STN liquid crystal 26 fills a panel constructed of glass substrates 21 and 22 and sealing members 23. The thickness of each of the two glass substrates 21 and 22 is 2 mm or thinner. A transparent electrode 24 is attached on the underside of the glass substrate 21, and a transparent electrode 25 is attached on the top surface of the glass substrate 22. ITO (Indium Tin Oxide) or tin oxide may be used for the transparent electrodes 21 and 22. The retardation film 14 is used as a color correction, optically anisotropic material to correct coloration generated by the STN liquid-crystal display panel 20. The lighting apparatus 70 employs an LED (Light Emitting Diode) 71, and projects light upward through a light guide 72.

Figure 6A:
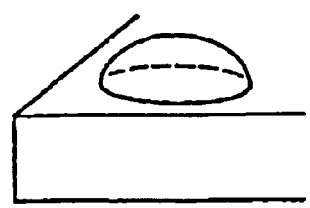
FIG. 6 shows the surface configuration of a light guide used in the display device of the first embodiment of the present invention.
Figure 6B:
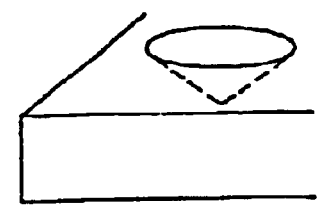
Figure 6C:
Figure 6D:
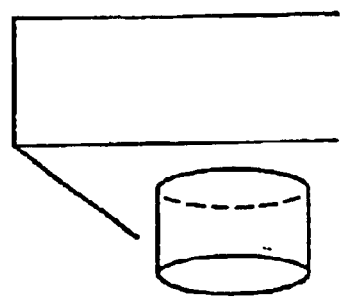
Figure 6E:
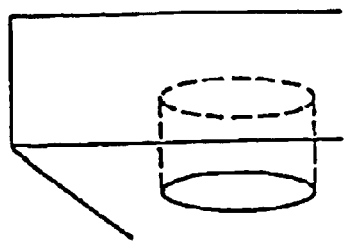

The lighting apparatus 70 is constructed as shown in FIG. 5. The light guide 72 is made of polycarbonate or acrylic transparent plastic plate and has a width within a range of 0.3 mm to 2 mm, and has a number of dimples or projections on its surface. The dimples or projections, each having a size ranging from 10 μm to 200 μm, are spaced with a pitch of 20 μm to 400 μm. As shown, each projection or dimple may be a semispherical projection shown in FIG. 6(a), a conical dimple shown in FIG. 6(b), a semispherical dimple shown in FIG. 6(c), a circular column projection shown in FIG. 6(d), a circular column dimple shown in FIG. 6(e), or any other shape. The density of dimples or projections may be changed to provide a uniform surface luminance on the light guide 72. For its surface dimples or projections, the light guide 72 also serves as a light diffusing plate.

Preferably, the light guide has a small optical anisotropy. The presence of optical anisotropy tends to cause discoloration or irregular coloration in the display.

The operation of the transflective display device 10 of this embodiment is now discussed referring to FIG. 4. Under the external light, in a voltage applied area, the natural ambient light is linearly polarized in a predetermined direction by the polarizer 12, and is then twisted in a polarization direction a predetermined angle by the STN liquid-crystal display panel 20, and is then reflected by the reflective polarizer 40 rather than being absorbed. The light ray is then twisted in a polarization direction a predetermined angle by the STN liquid-crystal display panel 20, and exits from the polarizer 12 as a linearly polarized light ray. In the voltage applied area, the light ray is not absorbed but reflected by the reflective polarizer 40, presenting a specular display.

In a non-voltage applied area, the natural ambient light is linearly polarized in a predetermined direction by the polarizer 12, and is then transmitted through the STN liquid-crystal display panel 20 as a linearly polarized light ray, and is transmitted through the reflective polarizer 40 as a linearly polarized light ray. The linearly polarized light ray thus transmitted is diffused by the light diffusing plate 30. A light ray component transmitted through the light diffusing plate 30 is reflected by the reflector 90, and is diffused by the light diffusing plate 30, and is transmitted through the STN liquid-crystal display panel 20 and polarizer 12, and exits as a linearly polarized light ray. Since the exiting light is a diffused light, it appears white.

The light ray reflected by the reflective polarizer 40 exits in a linearly polarized light ray featuring specularity in the voltage applied area while the light ray transmitted through the reflective polarizer 40 is thus diffused through the light diffusing plate 30 and then exits as a linearly polarized light ray presenting white color. With this arrangement, a specular display with a white background, namely, a dark display results.

With the light source lit, in a voltage applied area, the light ray emitted by the lighting apparatus 70 is transmitted through the reflective polarizer 40, and is then twisted in a polarization direction a predetermined angle by the STN liquid-crystal display panel 20 becoming a light ray linearly polarized in a predetermined direction, and is absorbed by the polarizer 12. The voltage applied area thus appears black.

In a non-voltage applied area, the light ray from the light source is transmitted through the reflective polarizer 40, and is then twisted in a polarization direction a predetermined angle by the STN liquid-crystal display panel 20 becoming a light ray linearly polarized in a predetermined direction, and is transmitted through the polarizer 12.

The light ray in the voltage applied area is absorbed by the polarizer 12, becoming dark while the light ray in the non-voltage applied area exits through the polarizer 12. A black display is presented with the color of the exiting light ray from the lighting apparatus as the background color.

The light diffusing plate 30 may be colored to change the background color. When the polarizer 12 is replaced with a reflective polarizer having the same structure as that of the reflective polarizer 40, a light white display is presented under the external light because such reflective polarizer is unable to absorb light unlike the polarizer 12.

When a green hologram was employed for the reflector 90, the diffusion displays in both the reflective display mode and the transmissive display mode were green-colored at one viewing angle. When a prism sheet was employed for the reflector 90, a black display with a light background was presented at one viewing angle.

Figure 7:
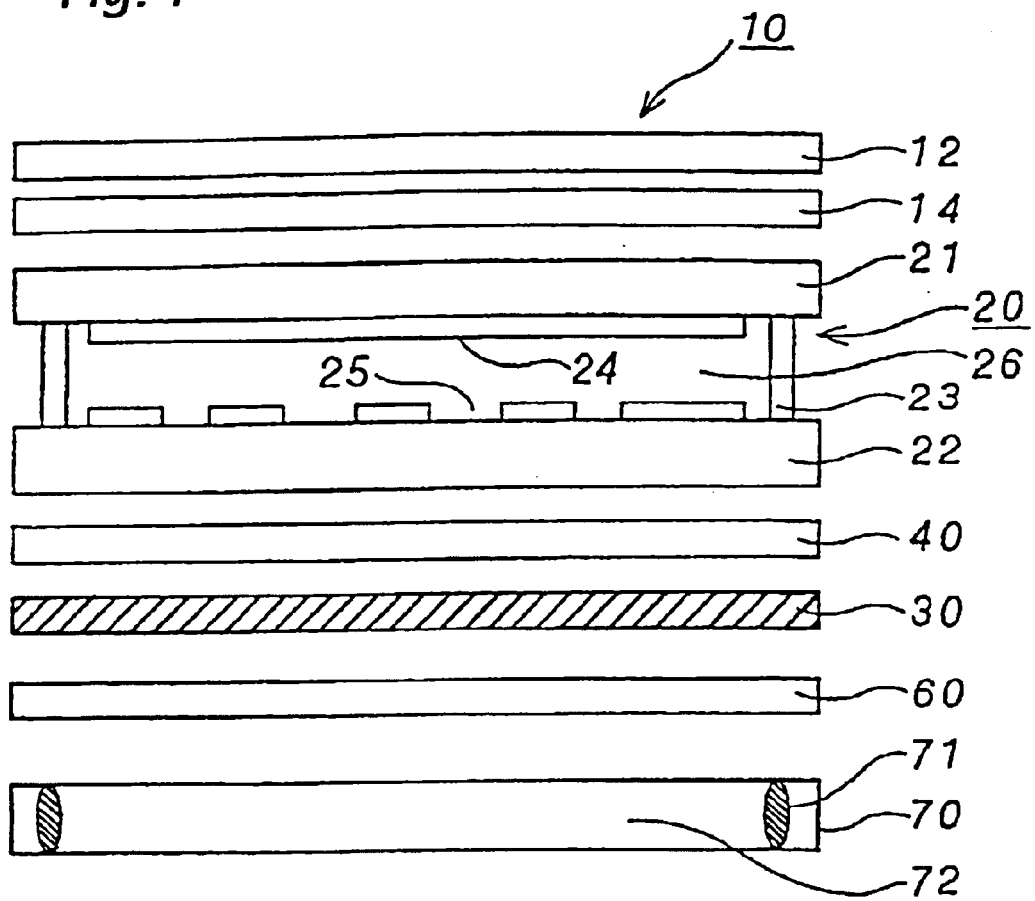
FIG. 7 is an exploded, cross-sectional view showing the display device of a second embodiment of the present invention.

FIG. 7 is an exploded, cross-sectional view showing the display device of a second embodiment of the present invention. In the second embodiment, a reflective polarizer 60 as the third polarizing splitter means is arranged between the light diffusing plate 30 and the lighting apparatus 70. The rest of the construction of the second embodiment remains unchanged from that of the first embodiment, and the detailed description about it is not repeated here.

Figure 8:
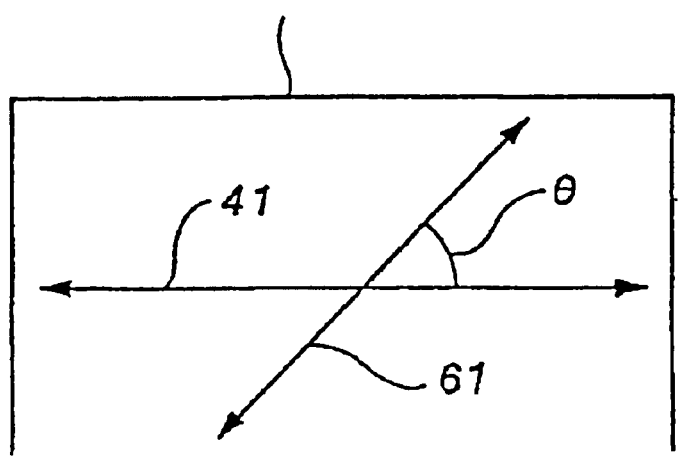
FIG. 8 illustrates the relationship between the polarization axis of the reflective polarizer 40 and the polarization axis of the reflective polarizer 60, both used in the display device of the second embodiment of the present invention.

FIG. 8 illustrates the relationship between the polarization axis of the reflective polarizer 40 and the polarization axis of the reflective polarizer 60, wherein 41 designates the polarization axis of the reflective polarizer 40 and 61 designates the polarization axis of the reflective polarizer 60. In the second embodiment, the angle $\theta$ between the polarization axis 41 and the polarization axis 61 is 68°.

The study of the display of the display device in the second embodiment revealed that the diffusion display became lighter in the reflective display mode because the light ray transmitted through the reflective polarizer 40 was reflected by the reflective polarizer 60.

The further study of the display with the magnitude of $\theta$ changing revealed the following tendency. With the angle $\theta$ decreasing, both the voltage applied area and the non-voltage applied area were lighter because most of the light ray in alignment with the polarization axis 61, which is transmitted through the reflective polarizer 60 with the light source lit, is transmitted through the reflective polarizer 40. Under the external light, most of the light ray in alignment with the polarization axis 41, which is transmitted through the reflective polarizer 40, is not reflected by the reflective polarizer 60. The lightness of the non-voltage applied area is not so much heightened. With the angle $\theta$ between the polarization axis 41 and the polarization axis 61 decreasing, the transmissive display mode offers a light display, while the non-voltage applied area in the reflective display mode is darkened. Conversely, with the angle $\theta$ between the polarization axis 41 and the polarization axis 61 increasing, the transmissive display mode presents a dark display, while the non-voltage applied area in the reflective display mode becomes light. The angle $\theta$ has its own appropriate range. According to test results, the angle $\theta$ is preferably within a range of 45° to 80°, and is more preferably within a range of 60° to 75°.

Figure 9:
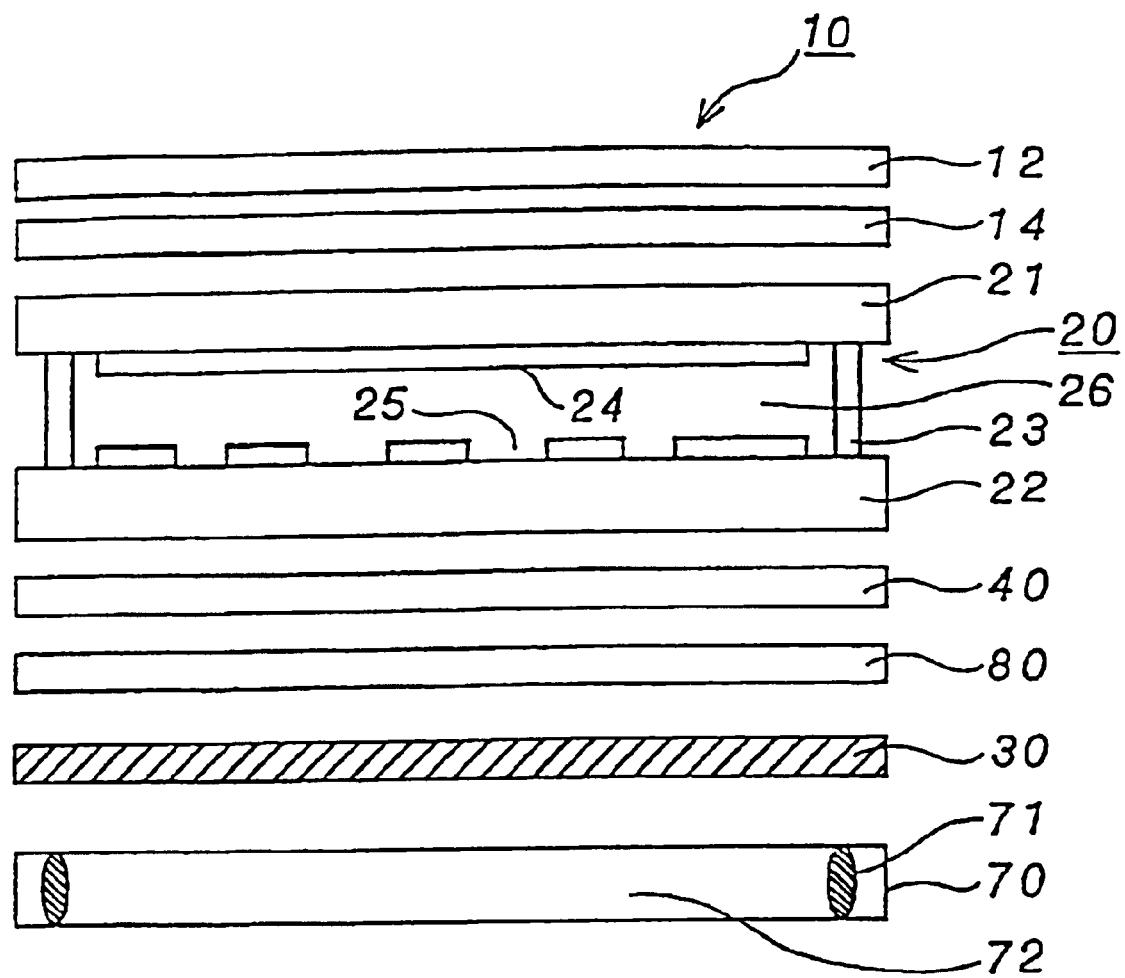
FIG. 9 is an exploded, cross-sectional view showing the display device of a third embodiment of the present invention.

FIG. 9 is an exploded, cross-sectional view showing the liquid-crystal display device of a third embodiment of the present invention. In the third embodiment, a Lumisty Film, manufactured by SUMITOMO CHEMICAL CO., LTD, as the exit angle control means, was arranged between the light diffusing plate 30 and the reflective polarizer 40. Since the rest of the construction of the third embodiment remains unchanged from that of the second embodiment, the detailed discussion about it is not repeated.

The light diffusing plate 30 contains micro-pearl dispersed therein and is a transflector serving also as reflective means. Lumisty 80, manufactured by SUMITOMO CHEMICAL CO., LTD., in combination with the light diffusing plate 30, has the effect of making the light exit angle different from the light incident angle as shown in FIG. 12. This is because Lumisty Film has the following structure and characteristics. Lumisty Film contains layers having different refractive indexes, each having a thickness of 3 $\mu$m. This laminate structure causes light diffraction, diffusing light. By adjusting the laminate structure, the direction of the diffuse light is controlled. When an incident angle is 70°, an exit angle becomes 90°. Even when the screen of the device is viewed at a right angle and shadowed by a user, the screen is not darkened and remains light. With this arrangement, the device screen is easy to view with an increased contrast. A removal of the retardation film 14 resulted in a blue display with a bright yellow background.

Figure 10:
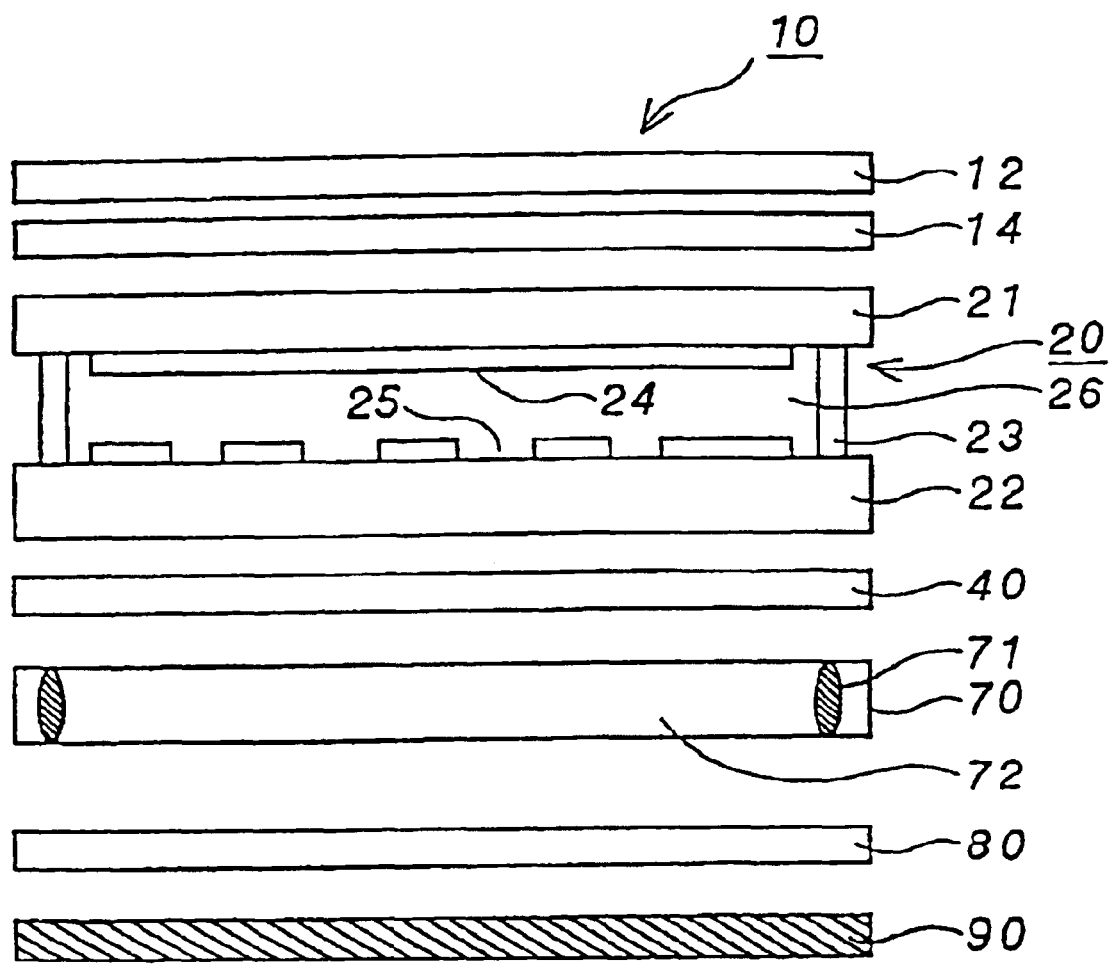
FIG. 10 is an exploded, cross-sectional view showing the display device of a fourth embodiment of the present invention.

FIG. 10 is an exploded, cross-sectional view of the liquid-crystal display device of a fourth embodiment of the present invention. In the fourth embodiment, Lumisty Film, manufactured by SUMITOMO CHEMICAL, CO., LTD, as the exit angle control means, was arranged between the lighting apparatus 70 and the reflector 90. The rest of the construction of the fourth embodiment remains unchanged from that of the first embodiment, and the detailed description about it is not repeated here.

With this arrangement, like the third embodiment, the screen is not darkened and remains light, and is easy to view with an increased contrast, even when the screen of the device is viewed at a right angle and shadowed by a user. When the light source is lit, the device screen is lighter than the one in the third embodiment.

Figure 11:
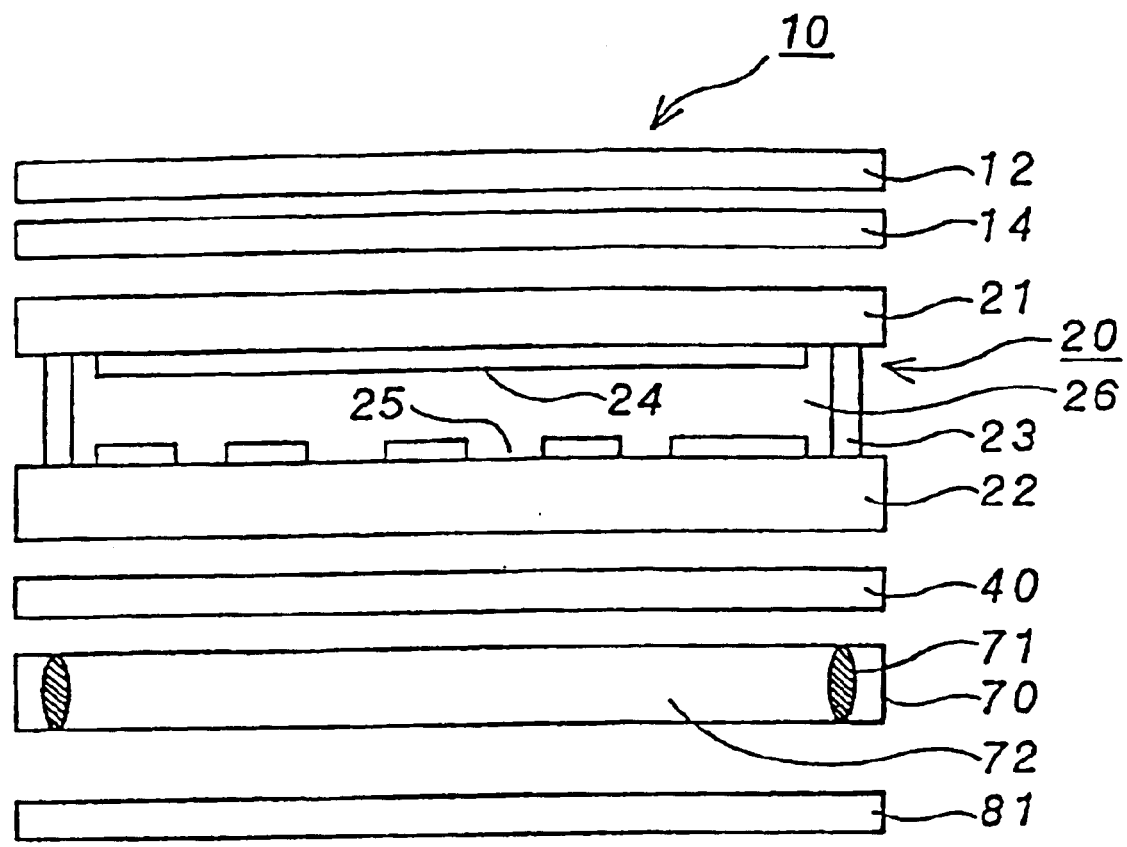
FIG. 11 is an exploded, cross-sectional view showing the display device of a fifth embodiment of the present invention.

FIG. 11 is an exploded, cross-sectional view of the display device of a fifth embodiment of the present invention. In the fifth embodiment, a fluorescent body 81 was arranged on the back surface of the lighting apparatus 70. The rest of the construction of the fifth embodiment remains unchanged from that of the first embodiment, and the detailed description about it is not repeated here.

With this arrangement, the fluorescent plate 81 is exposed to light both under the external light and with the light source lit, causing the screen to be light. The same effect results even if the fluorescent plate 81 is arranged between the lighting apparatus 70 and the reflective polarizer 40.

FIG. 13 shows the sixth embodiment of electronic apparatuses that incorporate the display device of the first embodiment. FIG. 13(a) shows a portable telephone, FIG. 13(b) shows a watch, FIG. 13(c) shows a personal computer. The electronic apparatuses of the sixth embodiment presented a bright display screen under daylight, shade, indoor and nighttime conditions. Any of the display devices of the first embodiment and third to fifth embodiments may be incorporated in the electronic apparatus of the sixth embodiment.

The display device of the present invention finds applications in a diversity of apparatuses, besides the above apparatuses, including home electronics, PDAs (Personal Digital Assistants), electronic pocketbooks, and calculators.

Under the external light, the display device of the present invention presents two display modes, namely the specular display mode resulting from the light ray reflected by the second polarizing splitter means and the diffusion display mode resulting from the diffused light ray from the light diffusing means, depending on the state of the polarization axis of the polarization axis varying means. In the specular display mode, the display screen is dark except for a viewing angle equal to the incident angle. In the diffusion display mode, the display screen is light in all directions. With the light source lit, the display device of the present invention presents the two display modes, namely, the dark display mode in which no light is transmitted through the first polarizing splitter means and the diffusion display mode resulting from the diffused light transmitted through the first polarizing splitter means, depending on the state of the polarization axis of the polarization axis varying means. The transflective display device thus presents a light positive display during the reflective display mode and also presents a positive display during the transmissive display mode.

Preferably, the reflective means is disposed on the side of the light diffusing means opposite to the second polarizing splitter means. With this arrangement, the display screen is light both in the reflective display mode and the transmissive display mode.

What is claimed is:

1. A display device comprising:

a polarization axis varying device;

a first polarizing splitter device disposed on one side of said polarization axis varying device and which transmits a light ray component linearly polarized in a first direction while reflecting or absorbing a light ray component linearly polarized in a predetermined direction different from said first direction;

a second polarizing splitter device, disposed on the other side of said polarization axis varying device and which reflects a light ray component linearly polarized in a second direction while transmitting a light ray component linearly polarized in a predetermined direction different from said second direction;

a lighting device disposed on the side of said second polarizing splitter device opposite to said polarization axis varying device; and a light reflective device, disposed on the side of said lighting device opposite to said second polarizing splitter device;

wherein said lighting device has a number of at least one of dimples and projections on a surface thereof on the viewer's side of the lighting device opposite to the light reflective device, and said surface also serving as a light diffusing plate diffusing and reflecting a light ray coming in from said second polarizing splitter device, while outputting a light ray toward said second polarizing splitter device.

2. A display device according to claim 1, wherein said lighting device transmits a light ray coming in from the side of said surface provided with a number of dimples or projections toward said light reflective device, while transmitting a light ray coming in from said light reflective device toward the side of said surface provided with a number of dimples or projections.

3. A display device according to claim 2, wherein said light reflective device emits a light ray.

4. A display device according to claim 2, wherein said light reflective device emits a color light ray.

5. A display device according to claim 1, further comprising a light exit angle control device, disposed between said second polarizing splitter device and said lighting device also serving as a light diffusing plate, for outputting a light ray at an exit angle within a predetermined range when receiving a light ray.

6. A display device according to claim 1, further comprising a light diffusing device, disposed between said second polarizing splitter device and said lighting device also serving as a light diffusing plate, for diffusing and reflecting a light ray coming in from said second polarizing splitter device, while transmitting a light ray coming from said lighting device toward said second polarizing splitter device.

7. A display device according to claim 6, further comprising a third polarizing splitter device disposed between said lighting device and said light diffusing device and which reflects a light ray component linearly polarized in a third direction, while transmitting a light ray component linearly polarized in a predetermined direction different from said third direction.

8. A display device according to claim 7, wherein said second polarizing splitter device and said third polarizing splitter device are disposed such that said second direction and said third direction are different from each other.

9. A display device comprising:

a liquid-crystal display panel having a liquid crystal interposed between a pair of substrates;

a polarizer disposed on one side of said liquid-crystal display panel;

a first reflective polarizer disposed on the other side of said liquid crystal display panel; and a lighting apparatus disposed on the side of said first reflective polarizer opposite to the polarizer;

wherein said lighting apparatus includes a light diffuser at a surface thereof, said light diffuser having a number of at least one of dimples and projections which diffuse and reflect a light ray coming in from said first reflective polarizer, while transmitting a light ray coming from said lighting apparatus toward said first reflective polarizer.

10. A display device according to claim 9, further comprising a reflector on the side of said lighting apparatus opposite to said surface including said light diffuser, wherein said lighting apparatus comprises a light source and a substantially transparent light guide.

11. An electronic apparatus having a display device with a liquid crystal display panel as a display unit, said display device comprising:

a liquid crystal display panel having a liquid crystal interposed between a pair of substrates;

a polarizer disposed on one side of said liquid crystal display panel;

a first reflective polarizer disposed on the other side of said liquid crystal display panel; and a lighting apparatus disposed on the side of first reflective polarizer opposite to the polarizer;

wherein said lighting apparatus includes a light diffuser at a surface thereof, said light diffuser having a number of at least one of dimples and projections which diffuse and reflect a light ray coming in from said first reflective polarizer, while transmitting a light ray coming in from said lighting apparatus toward said first reflective polarizer.

12. A display device according to claim 6, further comprising a light exit angle control device, disposed between said second polarizing splitter device and said lighting device also serving as a light diffusing plate, for outputting a light ray at an exit angle within a predetermined range when receiving a light ray.

* * * * *